(12) United States Patent
Murray et al.

(10) Patent No.: US 9,949,442 B2
(45) Date of Patent: Apr. 24, 2018

(54) CHOPPER FOR AN AGRICULTURAL HARVESTER

(71) Applicant: CNH Industrial America LLC, New Holland, PA (US)

(72) Inventors: Craig E. Murray, Davenport, IA (US); Justin L. Montenguise, Bettendorf, IA (US); Nicholas S. Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/700,564

(22) Filed: Apr. 30, 2015

(65) Prior Publication Data

US 2016/0316635 A1 Nov. 3, 2016

(51) Int. Cl.
  *A01F 29/06* (2006.01)
  *A01F 12/40* (2006.01)
  *A01D 41/00* (2006.01)
  *A01D 41/12* (2006.01)

(52) U.S. Cl.
  CPC .............. *A01F 29/06* (2013.01); *A01D 41/00* (2013.01); *A01D 41/1243* (2013.01); *A01F 12/40* (2013.01)

(58) Field of Classification Search
  CPC .......... A01F 29/06; A01F 29/01; A01F 12/40; A01F 29/00; A01F 29/02; A01F 29/025; A01F 29/04; A01F 29/14; A01F 29/16; A01F 29/18; A01D 41/00; A01D 41/1243; A01D 34/8355; A01D 43/08; A01D 43/088
  See application file for complete search history.

(56) References Cited

U.S. PATENT DOCUMENTS

| 2,670,775 A | * | 3/1954 | Elofson | ................... | A01F 12/40 239/650 |
| 2,810,583 A | * | 10/1957 | Elofson | ................... | A01F 12/40 239/650 |
| 2,858,867 A | * | 11/1958 | Elofson | ................... | A01F 12/40 239/650 |
| 2,862,536 A | * | 12/1958 | Gronberg | ................ | A01F 12/40 239/679 |

(Continued)

FOREIGN PATENT DOCUMENTS

| EP | 1 869 969 A2 | 12/2007 |
| EP | 2 036 422 A2 | 3/2009 |
| GB | 2165732 A | 4/1986 |

*Primary Examiner* — Alicia Torres
*Assistant Examiner* — Adam J Behrens
(74) *Attorney, Agent, or Firm* — Patrick M. Sheldrake

(57) ABSTRACT

An agricultural harvester includes a frame; a threshing and separating system carried by the frame; a cleaning system carried by the frame; a mounting surface carried by the frame; and a residue system including a chopper carried by the frame and supplied with crop material from the threshing and separating system and/or the cleaning system. The chopper includes a chopper frame mounted to the mounting surface and having at least one shaft opening formed through; a chopper shaft held in the at least one shaft opening that is configured to rotate and is carried by the frame independently of the chopper frame; at least one rotating knife carried by the chopper shaft; and at least one stationary knife held in the chopper frame.

9 Claims, 4 Drawing Sheets

(56) References Cited

U.S. PATENT DOCUMENTS

| | | | | |
|---|---|---|---|---|
| 2,892,478 | A | * | 6/1959 | Gronberg ................ A01F 12/40 |
| | | | | 241/190 |
| 2,954,812 | A | * | 10/1960 | Gronberg ................ A01F 12/40 |
| | | | | 24/10 R |
| 2,956,602 | A | * | 10/1960 | Gronberg ................ A01F 12/40 |
| | | | | 241/243 |
| 3,214,002 | A | * | 10/1965 | Kirkpatrick ............ A01D 57/20 |
| | | | | 198/369.7 |
| 4,628,946 | A | | 12/1986 | De Busscher et al. |
| 4,669,489 | A | * | 6/1987 | Schraeder ............... A01F 12/40 |
| | | | | 241/186.3 |
| 4,869,272 | A | | 9/1989 | Ricketts et al. |
| 5,947,396 | A | * | 9/1999 | Pierce .................... B02C 13/02 |
| | | | | 241/187 |
| 6,113,491 | A | * | 9/2000 | Holmen .................. A01F 12/40 |
| | | | | 460/111 |
| 6,231,439 | B1 | * | 5/2001 | Heidjann ................ A01F 12/40 |
| | | | | 460/110 |
| 6,251,009 | B1 | * | 6/2001 | Grywacheski .......... A01F 12/40 |
| | | | | 460/112 |
| 7,220,179 | B2 | | 5/2007 | Redekop et al. |
| 7,771,261 | B2 | | 8/2010 | Schlesser et al. |
| 2004/0009834 | A1 | * | 1/2004 | Laufenberg ............ A01D 69/08 |
| | | | | 474/73 |
| 2004/0053652 | A1 | * | 3/2004 | Duquesne .......... A01D 41/1243 |
| | | | | 460/112 |
| 2007/0144130 | A1 | * | 6/2007 | Geiser ................... A01D 80/00 |
| | | | | 56/14.9 |
| 2010/0291985 | A1 | * | 11/2010 | Pohimann .......... A01D 41/1243 |
| | | | | 460/112 |

\* cited by examiner

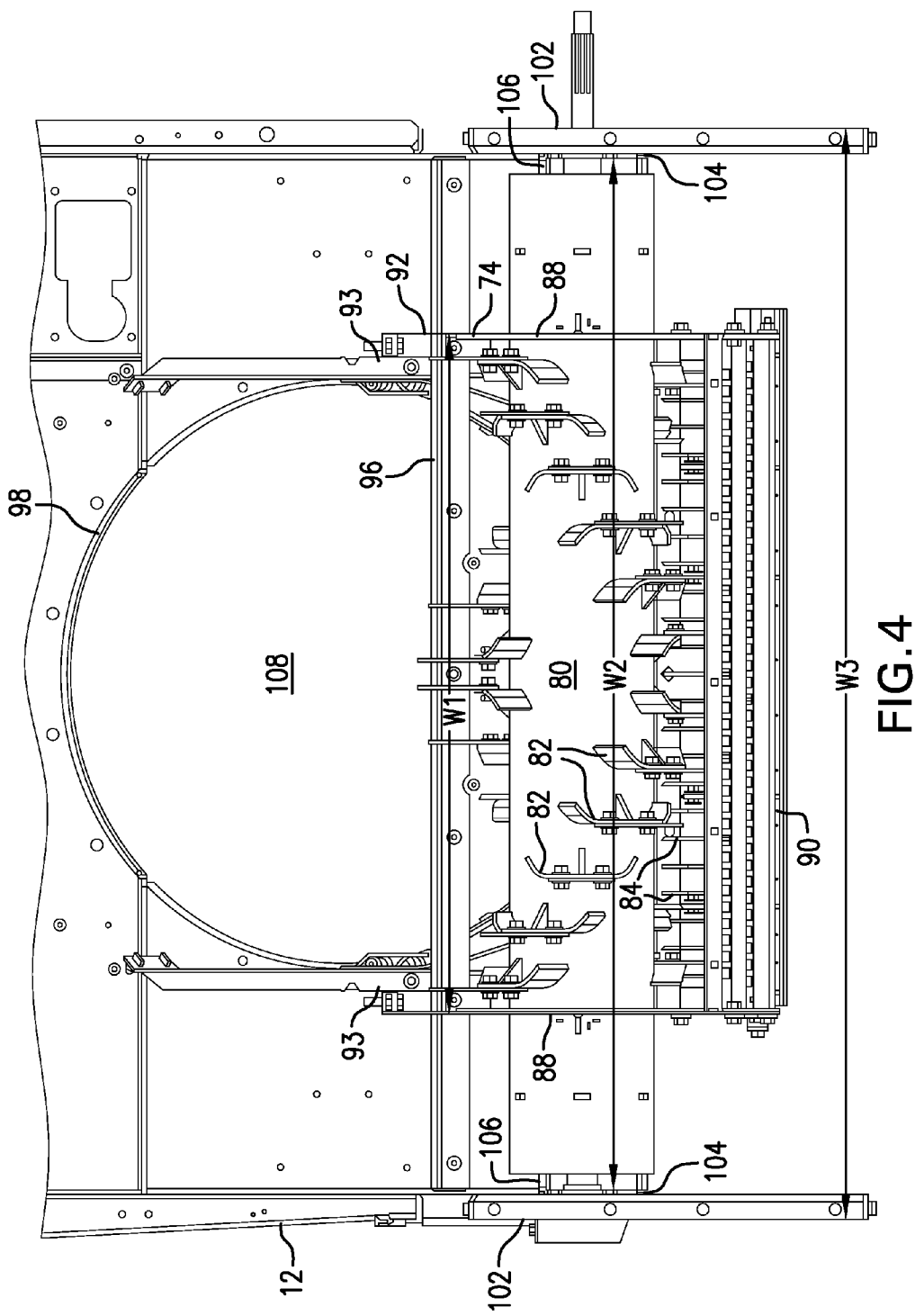

CHOPPER FOR AN AGRICULTURAL HARVESTER

BACKGROUND OF THE INVENTION

1. Field of the Invention

The present invention relates to agricultural harvesters, and, more particularly, to crop material choppers for agricultural harvesters.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field using a chopper/spreader unit. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

A chopper/spreader, as mentioned above, chops the non-grain residue to reduce the length of straw harvested for reduced time of degradation upon the field. The chopper can be supplied with MOG from the rotor of the threshing and separating system as well as the cleaning system. Typically, the chopper extends an entire width of the combine harvester frame to maximize the amount of available area to chop the MOG that goes into the chopper. One problem that arises from this configuration is that the MOG is allowed to spread to the width of the frame, which can make spreading of the residue onto the field more difficult. Further, it has been found that wear on the knives of the chopper is uneven, with some of the knives experiencing the majority of the wear while other knives are rarely worn, even after an extensive time operating.

What is needed in the art is an agricultural harvester that overcomes some of the previously described disadvantages.

SUMMARY OF THE INVENTION

The present invention provides an agricultural harvester with a frame and a chopper that includes a chopper frame with one or more shaft openings formed therein carried by the frame of the agricultural harvester and a chopper shaft with one or more knives connected thereto that is held in the shaft opening and carried by the frame of the agricultural harvester independently of the chopper frame.

The invention in one form is directed to an agricultural harvester including: a frame; a threshing and separating system carried by the frame; a cleaning system carried by the frame; a mounting surface carried by the frame; and a residue system including a chopper carried by the frame and supplied with crop material from the threshing and separating system and/or the cleaning system. The chopper includes a chopper frame mounted to the mounting surface and having at least one shaft opening formed through; a chopper shaft held in the at least one shaft opening that is configured to rotate and is carried by the frame independently of the chopper frame; at least one rotating knife carried by the chopper shaft; and at least one stationary knife held in the chopper frame.

The invention in another form is directed to a chopper for an agricultural harvester including a chopper frame defining a chopper width and having at least one shaft opening formed through; a chopper shaft held in the at least one shaft opening independently from the chopper frame that is configured to rotate and defines a shaft width that is greater than the chopper width; at least one rotating knife carried by the chopper shaft; and at least one stationary knife held in the chopper frame.

An advantage of the present invention is the chopper frame can be disconnected from side walls of the agricultural harvester to decrease deflection of the side walls and improve bearing alignment.

Another advantage is the chopper width can be reduced and require fewer knives compared to known choppers.

Yet another advantage is that MOG chopped by the chopper can have a reduced spread profile that is easier to control.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is another sectional view of the chopper shown in FIGS. 2-3.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
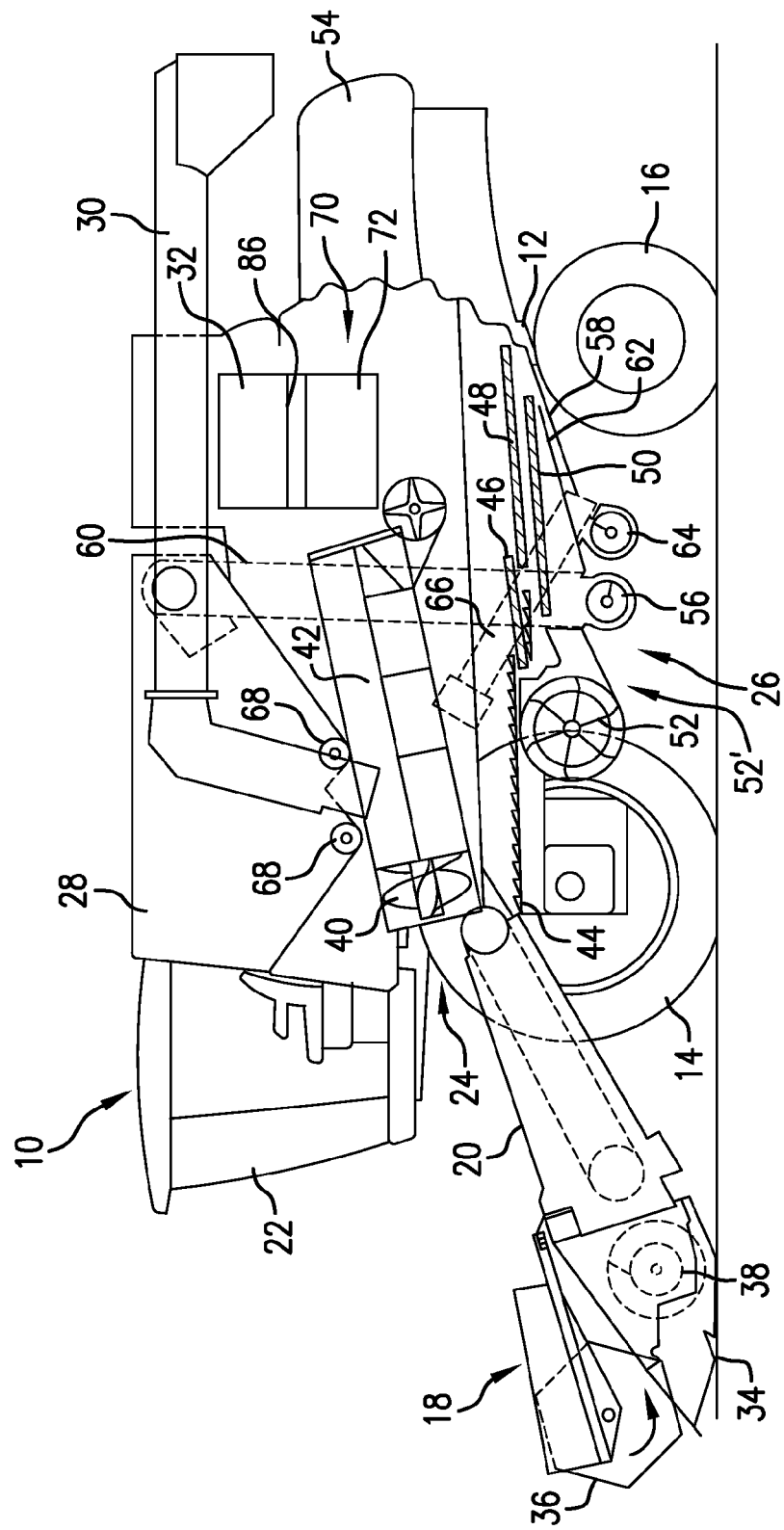
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12 (which can also be referred to as a frame), ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. While the rotatable reel 36 is shown as feeding crop material into the header 18, it should be appreciated that the rotatable reel 36 is optional. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 can include a chopper 72, which is drawn generically as a box in FIG. 1 to show its relative placement in the combine 10 and drawn in more detail in FIGS. 2-4, and a residue spreader.

Figure 2:
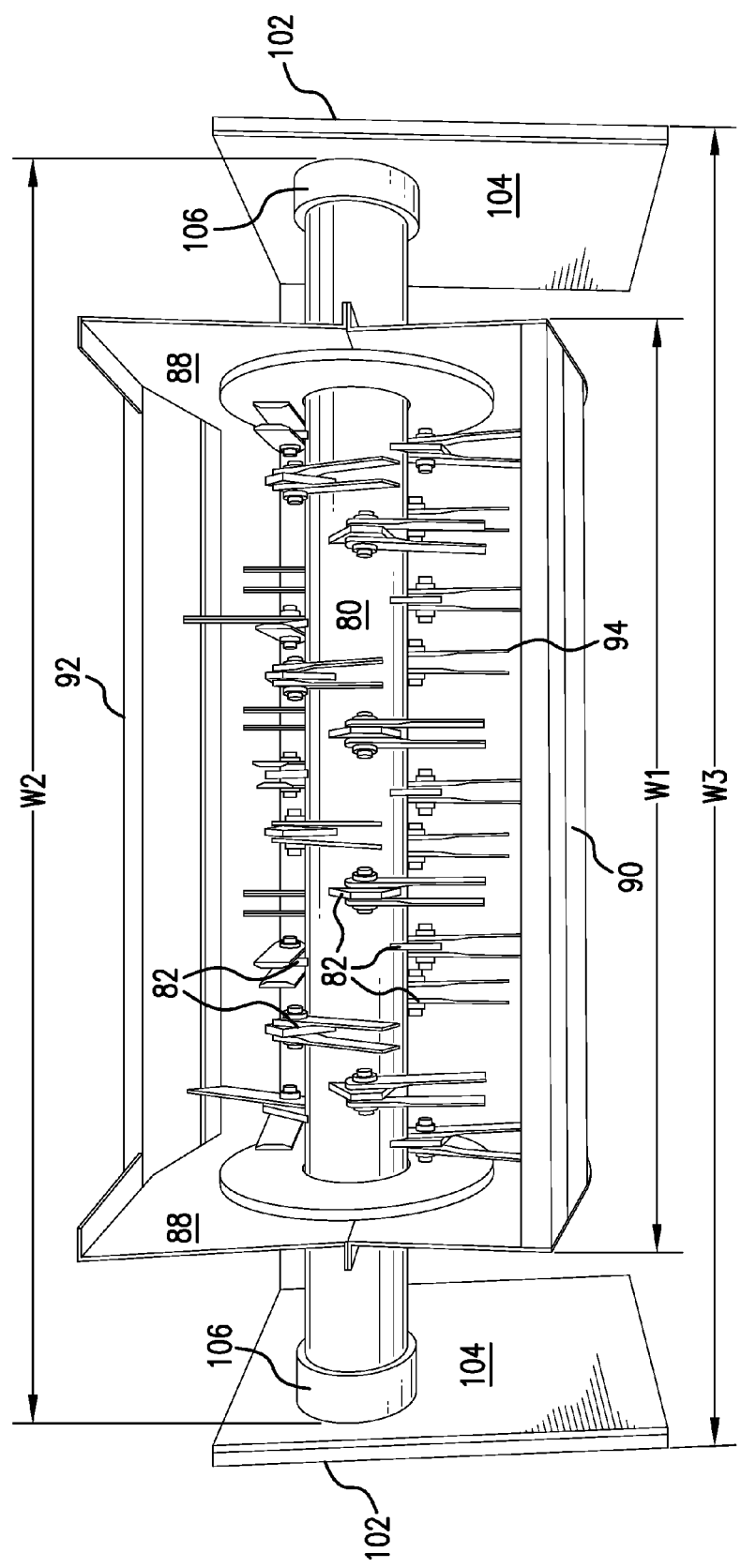
FIG. 2 is a rear view of an embodiment of a chopper according to the present invention carried by the agricultural harvester shown in FIG. 1.
Figure 3:
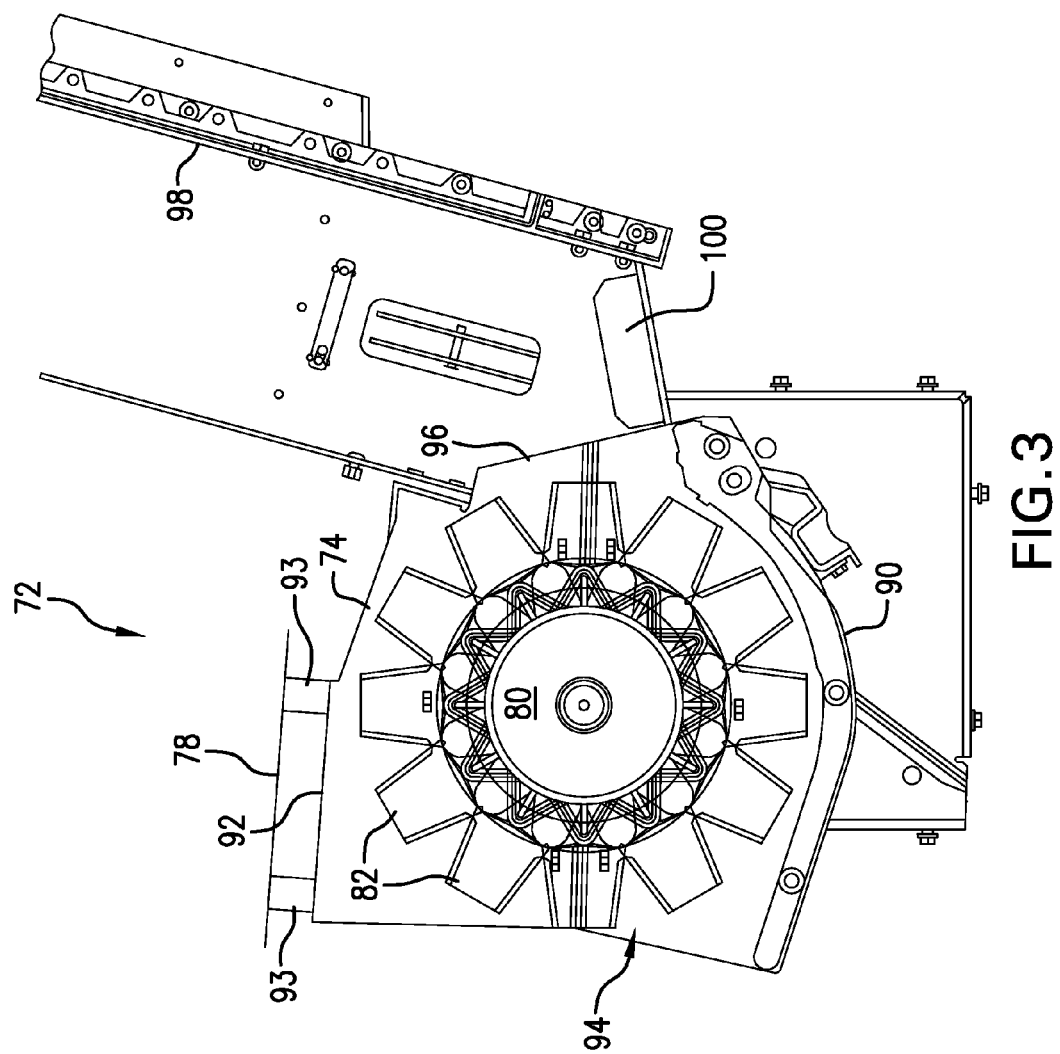
FIG. 3 is a sectional view of the chopper shown in FIG. 2.

Referring now to FIGS. 2-4, a chopper 72 of the residue handling system 70 is shown and generally includes a chopper frame 74 including shaft openings 76 formed through mounted to a mounting surface 78 carried by the frame 12, a chopper shaft 80 held in the shaft openings 76 of the chopper frame 74, one or more rotating knives 82 carried by the chopper shaft 80, and one or more stationary knives 84 held in the chopper frame 74. As can be seen, the mounting surface 78 can be a part of an engine deck 86 housing the diesel engine 32 shown in FIG. 1, but it should be appreciated that the mounting surface 78 can be any surface carried by the chassis 12 that the chopper frame 74 can be mounted to.

The chopper frame 74 is mounted to the mounting surface 78 and includes one or more shaft openings 76 which the chopper shaft 80 will be held within. The chopper frame 74 can have a pair of chopper sides 88, where the shaft openings 76 are formed, connected to a bottom 90 and a top 92. The top 92 can be mounted to the mounting surface 78 of the engine deck 86 by a mounting support 93 so that the bottom 90 of the chopper frame 74 is suspended in the air and does not contact any other parts of the combine 10. The bottom 90 can form a concave shape, as can be seen in FIGS. 2-3, so that gravity and the rotation of the chopper shaft 80 and rotating knives 82 force crop material along the bottom 90 of the chopper frame 74 and out of an open back 94 of the chopper 72. As can be seen in FIG. 3, the chopper frame 74 can have an inlet 96 at a front of the chopper frame 74 that receives crop material from an outlet 108 (shown in FIG. 4) formed in a sheet 98 that directs crop material from the separating and threshing assembly 24 via rotor 40 and/or the cleaning system 26 into the inlet 96. The chopper frame 74 can also be mounted to the sheet 98 by a sheet bracket 100 for additional support. As shown in FIGS. 2 and 4, the chopper frame 74 can have a chopper width W1 defined between the chopper sides 88 where the chopping action of the chopper 72 will occur. The chopper width W1 can be less than a frame width W2 defined between two side sheets 102 of the frame 12 of the harvester 10. In this configuration, the chopper 72 can have a chopping width W1 that is less than traditional choppers, which typically have widths equal to the width of the frame, so crop material that is directed into the chopper 72 has a smaller area to spread out compared to traditional choppers. When the chopper width W1 is less than the frame width W2, a space is formed between the chopper frame 74 and the side sheets 102 of the frame 12 that allows for air to evacuate past the chopper 72 and have a more direct path to the rear of the harvester 10.

The chopper shaft 80 is held in the shaft openings 76 of the chopper frame 74 and is carried by the frame 12 independently of the chopper frame 74. In other words, the chopper shaft 80 is not held in the shaft openings 76 by connection to the chopper frame 74, but held in the shaft openings 76 so that force transmitted through the chopper shaft 80 is not transmitted through the chopper frame 74, and vice versa. As shown in FIG. 2, the chopper shaft 80 may not even contact the chopper frame 74 but rather form a small gap between the chopper shaft 80 and the sides 88 of the chopper frame 74 so that the chopper shaft 80 is carried independently of the chopper frame 74. The chopper shaft 80 can be, for example, held within shaft mounts 104 that are bolted to the side sheets 102 of the frame 12 and may include circular projections 106 that cover the chopper shaft 80 to prevent material wrapping. In such a configuration, the chopper shaft 80 defines a shaft width W3 that is greater than the frame width W1 of the chopper frame 74. By carrying the chopper shaft 80 independently of the chopper frame 74, forces that go into the chopper frame 74 during operation can be transmitted to the harvester 10 independently from forces that are transmitted through the chopper shaft 80, sharing the forces that are created by the chopper 72 between two or more different elements in the harvester 10. It should be appreciated that the chopper shaft 80 can also be indirectly carried by the frame 12 of the harvester 10 independently of the chopper frame 74, such as by connection to an element that is carried by the frame 12. Compared to traditional choppers, which generally are mounted to the side sheets of the harvester frame, the chopper 72 configuration shown in FIGS. 2-4 transmits lower forces into the side sheets 102 of the frame 12 and causes less deflection of the side sheets 102.

One or more rotating knives 82 are carried by the chopper shaft 80 so that rotation of the chopper shaft 80 causes a corresponding rotation of the rotating knives 82. Any suitable configuration of knife can be used as the rotating knives 82 and the rotating knives 82 can be carried by the chopper shaft 80 in any arrangement to cut crop material directed into the chopper 72 into the desired size. Similarly, the stationary knives 84 held in the chopper frame 74 can be configured as any type of suitable knife and placed within the chopper frame 74 in a configuration that allows the rotating knives 82 and stationary knives 84 to work in tandem to cut crop material.

Referring now to FIG. 4 specifically, a sectional view of the chopper 72 mounted in the harvester 10 is shown from the rear. As can be seen, the inlet 96 of the chopper frame 74 can be held adjacent to the outlet 108 of the sheet 98. The outlet 108 can be circular in shape to correspond to the shape of the rotor 40 in concave 42. Crop material carried by the rotor 40 can therefore go directly into the chopper 72 from the rotor 40 through the outlet 108. It is also contemplated that crop material can be blown into the chopper 72 from the cleaning system 26 by the cleaning fan 52. For example, the cleaning fan 52 can blow crop material, such as MOG, from the cleaning system 26 directly into the inlet 96 of the chopper frame 74. By directing crop material into the chopper 72 from both the separating and threshing system 24 and the cleaning system 26, the chopper 72 can serve as a junction for the crop material that will be removed from the harvester 10 by the residue system 70.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a frame;
   a threshing and separating system carried by said frame;
   a cleaning system carried by said frame;
   a mounting surface carried by said frame; and
   a residue system including a chopper carried by said frame and supplied with crop material from at least one of said threshing and separating system and said cleaning system, said chopper including:
   a chopper frame mounted to said mounting surface and having at least one shaft opening formed through, wherein said chopper frame is suspended by an upper portion of the chopper frame mounted to said mounting surface;
   a chopper shaft held in said at least one shaft opening and configured to rotate, said chopper shaft being carried by said frame independently of said chopper frame;
   at least one rotating knife carried by said chopper shaft; and
   at least one stationary knife held in said chopper frame;
   wherein said frame includes a first side support and a second side support, said chopper frame and at least one of said first side support and said second side support defining a space therebetween wherein said space defines an airflow path to allow a horizontal air flow such that air can evacuate through the airflow path past the chopper toward a rear portion of the frame.

2. The agricultural harvester according to claim 1, wherein said chopper shaft is mounted to said frame.

3. The agricultural harvester according to claim 1, wherein said chopper shaft is mounted to a central portion of said first side support and said second side support, wherein the lower portions of said first side support and said second side support are connected by a bottom support that extends below the chopper.

4. The agricultural harvester according to claim 1, wherein said frame defines a frame width between said first side support and said second side support.

5. The agricultural harvester according to claim 1, wherein said chopper frame includes a first chopper side and a second chopper side defining a chopper width therebetween, at least one of said first chopper side and said second chopper side having said at least one shaft opening formed therethrough.

6. The agricultural harvester according to claim 1, further comprising a mounting support connecting said chopper frame to said mounting surface.

7. The agricultural harvester according to claim 1, further comprising an engine deck carried by said frame and an engine mounted within said engine deck, said engine deck including said mounting surface.

8. An agricultural harvester, comprising:
a frame;
a threshing and separating system carried by said frame;
a cleaning system carried by said frame;
a mounting surface carried by said frame; and
a residue system including a chopper carried by said frame and supplied with crop material from at least one of said threshing and separating system and said cleaning system, said chopper including:
a chopper frame mounted to said mounting surface and having at least one shaft opening formed through, said chopper frame having a top mounted to said mounting surface and an unsupported bottom opposite said top;
a chopper shaft held in said at least one shaft opening and configured to rotate, said chopper shaft being carried by said frame independently of said chopper frame;
at least one rotating knife carried by said chopper shaft; and
at least one stationary knife held in said chopper frame; and
wherein said chopper frame includes a pair of unsupported chopper sides, said top mounting to said mounting surface defining a sole support of said chopper frame.

9. The agricultural harvester according to claim 3, wherein at least one of said first side support and said second side support is an exterior side sheet of said frame.

* * * * *